United States Patent [19]

Ushida et al.

[11] Patent Number: 4,824,873

[45] Date of Patent: Apr. 25, 1989

[54] LEATHER-WRAPPED STEERING WHEEL

[75] Inventors: Yoshio Ushida, Inazawa; Sinji Jinushi, Gifu, both of Japan

[73] Assignee: Toyoda Gosei Co., Ltd., Nishikasugai, Japan

[21] Appl. No.: 108,591

[22] Filed: Oct. 15, 1987

[51] Int. Cl.$^4$ .............................................. C08G 18/14
[52] U.S. Cl. ....................... 521/137; 74/552; 74/558; 74/558.5; 428/65; 428/66; 428/327; 428/423.1; 428/423.4; 428/425.8; 521/174
[58] Field of Search ................ 521/137, 174; 74/552, 74/558, 558.5; 428/65, 66, 327, 423.1, 423.4, 425.8

[56] References Cited

U.S. PATENT DOCUMENTS

| | | | |
|---|---|---|---|
| 3,802,291 | 4/1974 | Young, Jr. et al. | 74/552 |
| 4,542,166 | 9/1985 | Mabuchi | 521/176 |
| 4,581,954 | 4/1986 | Uchida | 74/552 |

*Primary Examiner*—Maurice J. Welsh
*Attorney, Agent, or Firm*—Cushman, Darby & Cushman

[57] ABSTRACT

This invention is directed to a leather-wrapped steering wheel which has a core-covering part of low hardness and high repulsion elasticity and, therefore, permits a leather wrap part to be formed through no medium of any rubber layer. This steering wheel comprises a core, a core-covering part made of semirigid urethane foam, and a leather wrap part covering the core-covering part. The semirigid urethane foam is produced by the reaction injection molding of a urethane foam material for water molding using a polyether tape compound and/or a polymer polyol type compound as a polyol moiety and a MDI type compound as a polyisocyanate moiety. This semirigid urethane foam possesses hardness in the range of 40 to 65 (Asker C), repulsion elasticity in the range of 15 to 60%, and density in the range of 0.3 to 0.5 g/cm$^3$.

4 Claims, 1 Drawing Sheet

1 2 3 4

1 2 4

LEATHER-WRAPPED STEERING WHEEL

BACKGROUND OF THE INVENTION

This invention relates to a leather-wrapped steering wheel having the core thereof covered with a part made of semirigid urethane foam and the surface thereof finished with a leather wrap part.

FIG. 1 illustrates the stratal construction of a typical conventional leather-wrapped steering wheel.

The leather-wrapped steering wheel comprises a core 1, a core-covering part 2 made of semirigid urethane foam, a rubber layer 3 wrapped around the exterior of the core-covering part 2, and a leather wrap part 4 covering the rubber layer 3.

The semirigid urethane foam used in this construction has been generally produced by the reaction and injection molding of a urethane material which uses a polyether compound and/or a polymer polyol compound as the polyol moiety, a MDI compound as the polyisocyanate moiety, and a Freon (a proprietary fluorinated hydrocarbon product by DuPont) compound as the foaming agent.

The aforementioned semirigid urethane foam, however, is a foam possessing an integral-skin layer and exhibits high surface hardness of not less than 70 by the Askar C scale and low repulsion elasticity of not more than 15%. When the leather wrap part is formed as directly held in contact with the covering part made of the foam of the foregoing description, therefore, the feeling produced by the steering wheel on the hands taking hold of the steering wheel is not pleasant. Thus, it has been necessary to have a rubber layer (made of CR, for example) interposed between the covering part and the leather wrap part as described above, with the inevitable result that the number of steps of process for the manufacture of the steering wheel is increased and the weight of the steering wheel is proportionately increased.

SUMMARY OF THE INVENTION

An object of this invention is to provide a steering wheel which obviates the necessity for interposing a rubber layer between the urethane foam covering part and the leather wrap part and which decreases the number of steps and the weight of the steering wheel.

To be specific, this invention is derected to a steering wheel having the core thereof covered with a part made of semirigid urethane foam, the outer surface thereof finished with a leather wrap part, and the semirigid urethane foam produced by the reaction injection molding of a urethane foam material using a polyether type compound and/or a polymer polyol type compound as the polyol moiety and a MDI type compound as the polyisocyanate moiety, which steering wheel is characterized by the fact that the semirigid urethane foam is a water molded foam and possesses hardness in the range of 40 to 65 (Askar C), repulsion ealsticity in the range of 15 to 60%, and density in the range of 0.3 to 0.5 g/cm³. Owing to the construction in which the core covering part possesses low hardness and high repulsion elasticity, the steering wheel of the present invention, unlike the conventional countertype, obviates the necessity for the medium of a rubber layer in the formation of the leather wrap part. Since the step otherwise required in wrapping a rubber layer is no longer necessary, therefore, the number of steps of process for the manufacture of the leather-wrapped steering wheel is decreased. Further, the weight of the steering wheel is small because of the omission of the rubber layer coupled with the low density of the foam.

DESCRIPTION OF THE PREFERRED EMBODIMENT

I. The urethane foam material for use in the steering wheel of the present invention comprises Solution A composed of 100 parts by weight of the following polyol moiety, 1 to 2 parts by weight of water as a combination cross-linking agent and a foaming agent, and 0.2 to 1.0 part by weight of a catalyst described below and Solution B composed of the following MDI type polyisocyanate moiety. Prior to the reaction injection molding of the urethane foam material, the polyol moiety and the polyisocyanate moiety are mixed in an equivalent ratio. If in this mixing, the amount of water is less than 1 part by weight, the expansion ratio (density) to be desired cannot be attained. If it exceeds 2 parts by weight, the cross-linking density increased so much that the softness aimed at cannot be attained.

(A) Polyol moiety

The following polyether type compound and polymer polyol type compound may be used of each other. From the viewpoint of hardness and repulsive elasticity, however, they are preferably used in a mixed state.

(1) Polyether type—This is a bifunctional or trifunctional polyether polyol which is produced by addition of an alkylene oxide such as ethylene oxide or propylene oxide to a low-molecular weight polyol such as glycerin or trimethyulol porpane and possessing a molecular weight in the range of 2,000 to 7,000.

(2) Polymer polyol type—This is trifunctional polymer polyol which is produced by graft polymerization vinyl such as acryl or styrene to the aforementioned polyether polyol and possessing a molecular weight in the range of 3,000 to 8,000.

(B) Catalyst

Examples of the catalyst usable herein include triethylene diamine, triethyl amine, N-dimethyl cyclohexyl amine, N,N-dimethylethanol amine, N,N-diethanol amine, pentamethyl ethanol amine, pentamethyl diethylene triamine, dibutyl tin dilaurate, stannous octylate, and cobalt octylate.

(C) Polyisocyanate moiety

A MDI (4,4-diphenyl methane diisocyanate) type compound is used. One member or a mixture of at least two members selected from among pure MDI, polymeric MDI, and liquid MDI can be used. The mixture of the pure MDI and the polymeric MDI is used more desirably because the foam consequently produced has low temperature dependency of hardness (Asker C).

Figure 1:
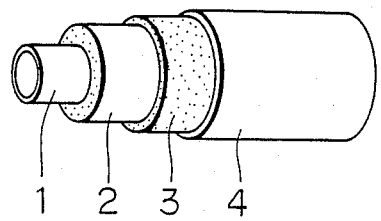
FIG. 1 is a partial perspective view of a rim section of a conventional leather-wrapped steering wheel.
Figure 2:
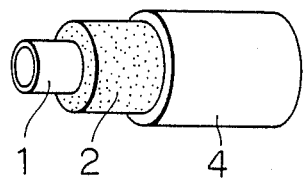
FIG. 2 is a partial perspective view of a rim section of a leather-wrapped steering wheel according to the present invention.

II. On the core 1, the covering part 2 is formed by the reaction injection molding of the aforementioned foam material. Since the covering part 2 thus formed is a water expanded foam, it is completely devoid of an integral-skin layer but is formed of the expanded foam throughout the entire volume thereof even including the surface region. As compared with the covering part which has an integral-skin layer, the covering part of this invention possesses low surface hardness, high repulsion elasticity, and low density. To be more specific, the urethane foam exhibits hardness in the range of 40 to 65 (Asker C), repulsive elasticity in the range of 15 to 60%, and density in the range of 0.3 to 0.5 g/cm³. As the result, the leather wrap part 4 can be formed as held in direct contact with the covering part 2 as illustrated in FIG. 2.

EXAMPLE

A covering part 2 was formed on a core 1 by the reaction injection molding of a varying urethane foam material formulaeated as shown in Table 1 under the conditions (pressure of injection, die temperature, etc.) indicated correspondingly in the table. The covering part thus produced was tested for hardness, repulsion elasticity, and density.

Figure 3:
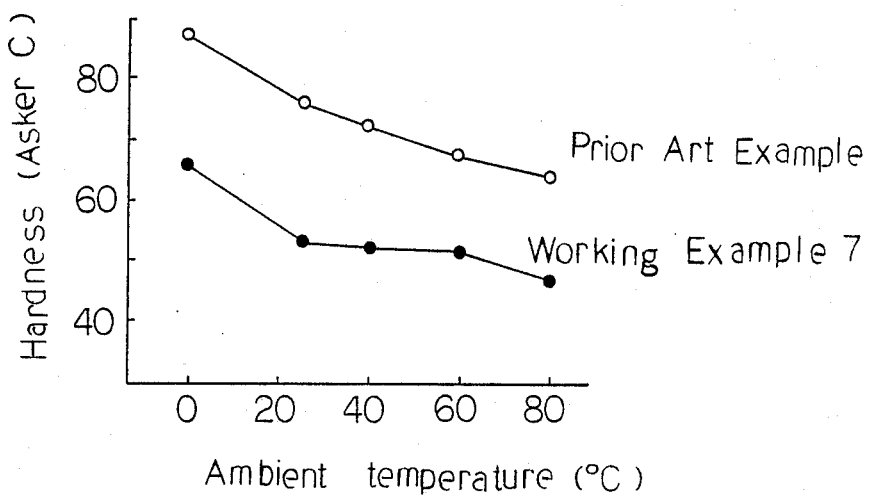
FIG. 3 is a graph showing the temperature dependency of a covered part of the steering wheel of this invention.

The result of the test are shown in Table 1. It is noted from this table that the properties of the covering parts obtained in the working examples based on the production of a water expanded foam were superior to those obtained by the conventional method using diethylene glycol as a cross-linking agent in Freon foaming. To be specific, the magnitudes of hardness exhibited in the working examples were lower, those of repulsion elasticity were higher, and those of density were decisively smaller than those exhibited in the comparative experiments. When the mixture of pure MDI with polymeric MDI was used as the polyisocyanate moiety, the temperature dependency of hardness of the covering part consequently produced was stable at temperatures between 23° C. and 80° C. as compared with that of the covering part of the conventional method (as measured using test pieces 5 mm in thickness) as shown in the graph of FIG. 3.

TABLE 1

| Name of compound | Conventional method | Test Example 1 | 2 | 3 | 4 | 5 | 6 | 7 | 8 |
|---|---|---|---|---|---|---|---|---|---|
| Polyether  f = 2  MW = 2000 |  | 50 |  |  |  | 50 |  |  |  |
| Polyol     f = 2  MW = 4000 | 50 |  | 50 |  |  |  | 50 |  |  |
| Polyether  f = 3  MW = 4900 |  |  |  | 50 |  |  |  | 50 |  |
| Polyol     f = 3  MW = 6000 | 50 |  |  |  | 50 |  |  |  | 50 |
| Polymer polyol  f = 3  MW = 6000 |  | 50 | ← | ← | ← | ← | ← | ← | ← |
| Diethylene glycol (cross-linking agent) | 18 |  |  |  |  |  |  |  |  |
| Triethylene diamine (catalyst) | 0.7 | 0.4 | ← | ← | ← | ← | ← | ← | ← |
| Freon-11 (forming agent) | 16 |  |  |  |  |  |  |  |  |
| Water (combination cross-linking agent and foaming agent) |  | 1.5 | ← | ← | ← | ← | ← | ← | ← |
| Pure MDI (NCO 23%) |  | 4.6 | 41 | 42 | 41 |  |  |  |  |
| Pure MDI 150/polymeric MDI 150 (NCO 28%) | 65 |  |  |  |  | 38 | 34 | 35 | 34 |
| Rigidity (Ascar C type) | 75 | 43 | 52 | 57 | 61 | 51 | 61 | 64 | 64 |
| Repulsion elasticity (ASTM D1054), % | 14 | 16 | 18 | 27 | 27 | 24 | 34 | 37 | 33 |
| Density (g/cm³) | 0.70 | 0.32 | 0.33 | 0.34 | 0.34 | 0.34 | 0.33 | 0.37 | 0.37 |

What is claimed is:

1. A leather-wrapped steering wheel, comprising a core, a core-covering part, and a leather wrap part covering said core-covering part, which leather-wrapped steering wheel is characterized by the fact that said core-covering part is made of semirigid urethane foam, said semirigid urethane foam is produced by the reaction injection molding of a urethane foam material for water expansion using a polyether type compound and/or a polymer polyol type compound as the polyol moiety therof and a MDI type compound as the polyisocyanate moiety thereof, and said semirigid urethane foam possesses hardness in the range of 40 to 65 (Asker C), repulsion elasticity in the range of 15 to 60%, and density in the range of 0.3 to 0.5 g/cm³.

2. The leather-wrapped steering wheel according to claim 1, wherein said urethane foam material contains water as a combination cross-linking agent and foaming agent in an amount in the range of 1 to 2 parts by weight, based of 100 parts by weight of said polyol moiety.

3. The leather-wrapped steering wheel according to claim 1, wherein said polyol moiety is a mixture of a polyether compound with a polymer polyol type compound.

4. The leather-wrapped steering wheel according to claim 1, wherein said MDI type polyisocyanate moiety is a mixture of pure MDI and polymeric MDI.

* * * * *